(12) United States Patent
Ma et al.

(10) Patent No.: US 8,650,638 B2
(45) Date of Patent: Feb. 11, 2014

(54) SYSTEM AND METHOD FOR DETECTING A FILE EMBEDDED IN AN ARBITRARY LOCATION AND DETERMINING THE REPUTATION OF THE FILE

(75) Inventors: Denys Lok Hang Ma, Santa Clara, CA (US); Vinay Mahadik, Santa Clara, CA (US); Swapnil Pathak, Pune (IN)

(73) Assignee: McAfee, Inc., Santa Clara, CA (US)

( * ) Notice: Subject to any disclaimer, the term of this patent is extended or adjusted under 35 U.S.C. 154(b) by 62 days.

(21) Appl. No.: 13/276,197

(22) Filed: Oct. 18, 2011

(65) Prior Publication Data
US 2013/0097661 A1    Apr. 18, 2013

(51) Int. Cl.
*G06F 21/00* (2013.01)
(52) U.S. Cl.
USPC ............... 726/22; 726/1; 713/187; 713/188
(58) Field of Classification Search
USPC ................. 713/187, 188; 726/1, 22
See application file for complete search history.

(56) References Cited

U.S. PATENT DOCUMENTS

| | | | |
|---|---|---|---|
| 5,892,904 A * | 4/1999 | Atkinson et al. ............... | 726/22 |
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,312,536 B2 * | 11/2012 | Nachenberg et al. ........... | 726/22 |
| 8,365,287 B2 * | 1/2013 | Yoo ................................ | 726/24 |
| 2002/0069198 A1 | 6/2002 | Stebbings et al. | |
| 2009/0210511 A1 | 8/2009 | Thomason | |
| 2011/0091032 A1 | 4/2011 | Sato et al. | |

FOREIGN PATENT DOCUMENTS

WO    WO 03/054728    7/2003

OTHER PUBLICATIONS

Goppit, Portable Executable File Format—A Reverse Engineer View, CodeBreakers Magazine, Jan. 2006, 87 pages.
McAfee Global Threat Intelligence, Data Sheet, copyright 2010, retrieved and printed on Oct. 18, 2011 from http://www.mcafee.com/us/resources/data-sheets/ds-global-threat-intelligence.pdf, 2 pages.
Reputation: The Foundation of Effective Threat Protection, Jamie Barnett, White Paper, retrieved and printed on Oct. 18, 2011 from http://www.mcafee.com/us/resources/white-papers/wp-rep-effective-threat-protection.pdf, 11 pages.
The New Era of Botnets, Zheng Bu, et al., White Paper, retrieved and printed on Oct. 18, 2011 from http://www.mcafee.com/us/resources/white-papers/wp-new-era-of-botnets.pdf, 14 pages.
International Search Report and Written Opinion for International Application No. PCT/US2012/060473 mailed Jan. 24, 2013 (9 pages).

* cited by examiner

*Primary Examiner* — Kambiz Zand
*Assistant Examiner* — Imhotep Durham
(74) *Attorney, Agent, or Firm* — Patent Capital Group

(57) ABSTRACT

A method is provided in one example embodiment that includes identifying a file format identifier associated with a beginning of a file, parsing the file based on the file format identifier until an end of the file is identified, and calculating a hash from the beginning of the file to the end of the file. The method may also include sending the hash to a reputation system and taking a policy action based on the hash's reputation received from the reputation system.

15 Claims, 7 Drawing Sheets

FIG. 4A

```
Pseudo C Code Algorithm find_secret_malware()
{
    /* Search for MZ String */
402 ptr=stream;
404 if ( !( (ptr[0]==0x4D) &&
406        (ptr[1]==0x5A) &&
408        ((ptr[3]&0xFE) == 0)
           ))
    {
        strcat(results, "First 4 byte fail. Invalid PE File.");
410     exit;
    }
412 ptr=stream+4;
414 if ( !( (ptr[1]==0) &&
416        ((ptr[2]&0xE0)==0) &&
418        (ptr[3]== 0)
           ))
    {
        strcat(results, "Second 4 byte fail. Invalid PE File.");
420     exit;
    }
422 ptr=stream+8;
424 if ( !( ((ptr[0]&0xC0)==0x00) &&
426        (ptr[1]==0x00) &&
428        ((ptr[3]&0xFE) == 0x00)
           ))
    {
        strcat(results, "Third 4 byte fail. Invalid PE File.");
430     exit;
    }
    /* We now have start of PE file. Start Hashing. */

432 start_hash_function_from_start();

/* Now to parse the PE header to find end of PE file. Find PE00.. string. */ mz_start = stream;

434 pe_offset = valueat(mz_start+0x3C);
    pe_magic_str[] = {'P', 'E', 0, 0};
```

FROM FIG. 4A

```
                // find PE Magic String at offset
436 ——  if ( compare(mz_start+pe_offset, pe_magic_str) == notfound )
438 ——  { strcat(results,"PE00 string not found. Invalid PE file."); exit; } pe_start = mz_start+pe_offset;
440 ——  sizeofoptionalheader = valueat(pe_start+20);
442 ——  numberofsections = valueat(pe_start+6);

// 24 (4 bytes of PE00 + 20 bytes of COFF Header)
                // + 12 (8byte section name + 4 byte virtual size)
                // + 40 byte is each section header len 444 ——  jmp2lastsection = 24 + 12 + (40*(numberofsections-1)) + sizeofoptionalheader;

446 ——  certificate_check = valueat(pe_start+128+24);
                if(certificate_check == found)
                  {
                    //calculating length of certificate
448 ——          certificate_len = *(unsigned int*)(pe_start+132+24);
                  }
450 ——  else certificate_len = 0;

// find last sections start and total size.
452 ——  rawdataSize = valueat(pe_start + jmp2lastsection + 4);
454 ——  pointer2rawData = valueat(unsigned int *)(pe_start + jmp2lastsection + 8);

// The start is relative to start of PE file itself, so we don't need
                // to add previous lengths calculated so far.
456 ——  calc_size = pointer2rawData+rawdataSize+certificate_len;

/* Calc_size gives us the total size of the PE file calculated without
                any support from the protocol itself, but based entirely on the PE file
                headers. The calc_size added to the start of the PE file found above gives
                the end of the PE file. */

458 ——  stop_hash_when_calc_size_byte_is_processed();

460 ——  check_dirtiness_of_hash_with_cloud();

462 ——  take_response_actions_if_any();

FROM FIG. 5A

```
0000170: 802b 0100 8c00 0000 0060 0100 6089 0000  .+.......`..`...
0000180: 0000 0000 0000 0000 0000 0000 0000 0000  ................
0000190: 0000 0000 0000 0000 4012 0000 1c00 0000  ........@.......
00001a0: 0000 0000 0000 0000 0000 0000 0000 0000  ................
00001b0: 0000 0000 0000 0000 0000 0000 0000 0000  ................
00001c0: 6002 0000 8000 0000 0010 0000 2802 0000  `...........(...
00001d0: 0000 0000 0000 0000 0000 0000 0000 0000  ................
00001e0: 0000 0000 0000 0000 2e74 6578 7400 0000  .........text...
00001f0: b026 0100 0010 0000 0028 0100 0004 0000  .&.......(......
0000200: 0000 0000 0000 0000 0000 0000 2000 0060  ............ ..`
0000210: 2e64 6174 6100 0000 1c10 0000 0040 0100  .data........@..
0000220: 000a 0000 002c 0100 0000 0000 0000 0000  .....,..........
0000230: 0000 0000 4000 00c0 2e72 7372 6300 0000  ....@....rsrc...
0000240: 6089 0000 0060 0100 008a 0000 0036 0100  `....`.......6..
0000250: 0000 0000 0000 0000 0000 0000 4000 0040  ............@..@
0000260: 0ffe 7d3b 3800 0000 0efe 7d3b 4400 0000  ..};8.....};D...
0000270: 0efe 7d3b 4f00 0000 0efe 7d3b 5c00 0000  ..};O.....};\...
0000280: 0efe 7d3b 6900 0000 0efe 7d3b 7300 0000  ..};i.....};s...
0000290: 0000 0000 0000 0000 5348 454c 4c33 322e  ........SHELL32.
00002a0: 646c 6c00 6d73 7663 7274 2e64 6c6c 0041  dll.msvcrt.dll.A
00002b0: 4456 4150 4933 322e 646c 6c00 4b45 524e  DVAPI32.dll.KERN
00002c0: 454c 3332 2e64 6c6c 0047 4449 3332 2e64  EL32.dll.GDI32.d
00002d0: 6c6c 0055 5345 5233 322e 646c 6c00 0000  ll.USER32.dll...
```

543a — 543b — 543c — 552 — 554

… # SYSTEM AND METHOD FOR DETECTING A FILE EMBEDDED IN AN ARBITRARY LOCATION AND DETERMINING THE REPUTATION OF THE FILE

TECHNICAL FIELD

This specification relates in general to the field of network security, and more particularly, to a system and method for detecting a file embedded in an arbitrary location and determining the reputation of the file.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated by the continually evolving array of tactics implemented by malicious operators. If certain types of malicious software can infect a host computer, it may also be able perform any number of malicious actions, such as sending out spam or malicious emails from the host computer, stealing sensitive information from a business or individual associated with the host computer, propagating to other host computers, and/or assisting with distributed denial of service attacks, for example. In addition, the malicious operator can sell or otherwise give access to other malicious operators, thereby escalating the exploitation of the host computers. Hence, significant challenges remain for developing innovative tools to combat tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-4B are a listing of a pseudo C code algorithm illustrating potential operations that may be associated with the network environment; and FIGS. 5A-5B provide a hexadecimal view of an example file that may be embedded in an arbitrary location of a network flow.

DETAILED DESCRIPTION OF EXAMPLE EMBODIMENTS

Overview

A method is provided in one example embodiment that includes identifying a file format identifier associated with a beginning of a file, parsing the file based on the file format identifier until an end of the file is identified, and calculating a hash from the beginning of the file to the end of the file. The method may also include sending the hash to a reputation system and taking a policy action based on the hash's reputation received from the reputation system.

In more particular embodiments, the file may be an executable file and the format identifier may include an "MZ" string indicative of an executable file format for a particular operating system. Parsing the file may include parsing a header in the file to determine a size of the file, which can be used to locate the end of the file.

Example Embodiments

Figure 1:
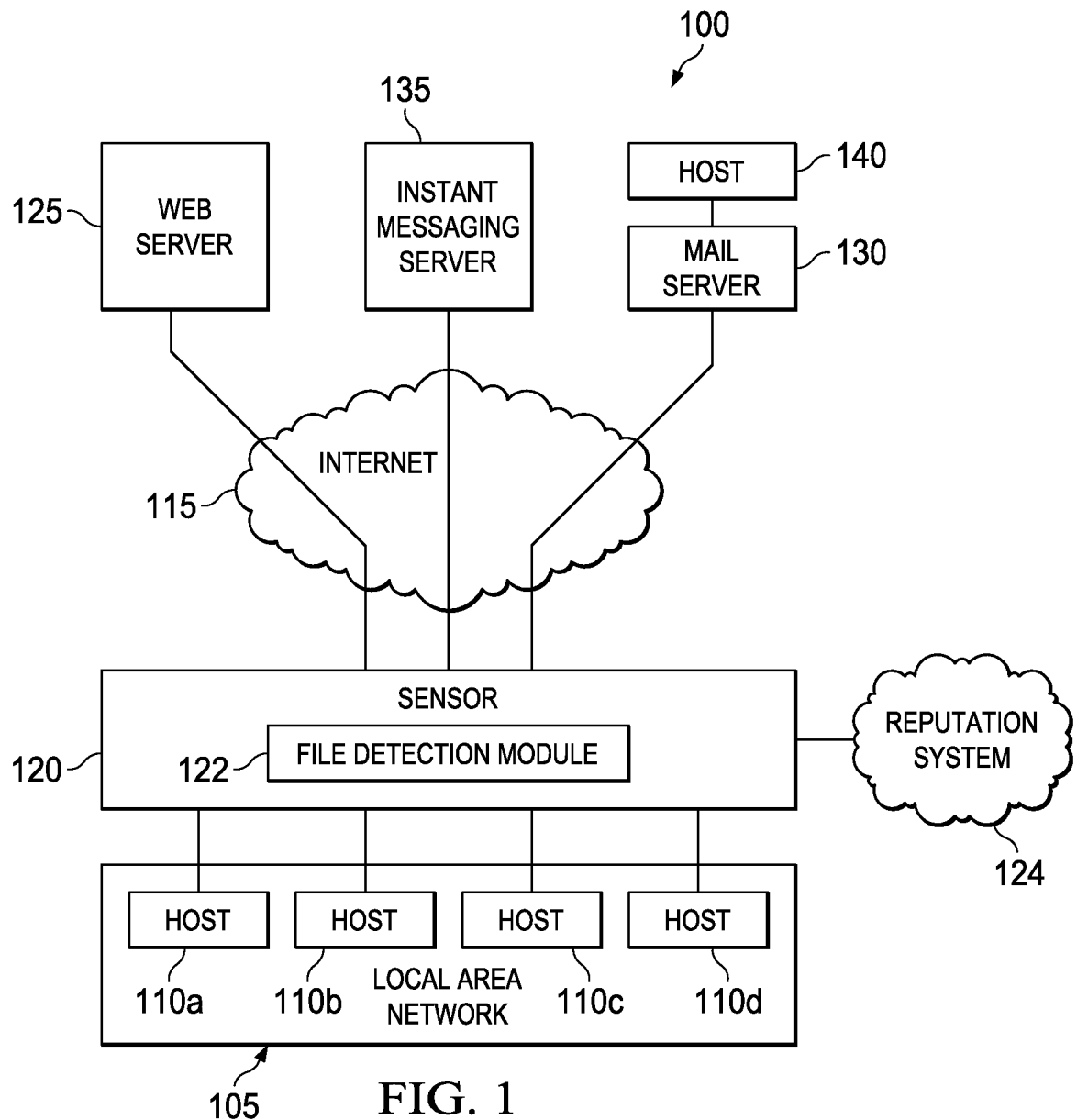
FIG. 1 is a simplified block diagram illustrating an example embodiment of a network environment for detecting a file embedded in an arbitrary location in accordance with this specification.

Turning to FIG. 1, FIG. 1 is a simplified block diagram of an example embodiment of a network environment 100 in which a file embedded in an arbitrary location may be detected. Network environment 100 may include a local area network 105 of nodes, such as hosts 110*a*-110*d*, which may be connected to the Internet 115 through another node, such as a sensor 120, having an embedded file detection module 122. Sensor 120 may also be connected to a reputation system 124, which may be a remote, cloud-based reputation system in some embodiments.

A node, in general, is any system, machine, device, network element, client, server, peer, service, application, or other object capable of sending, receiving, or otherwise communicating data on a network. Links between nodes in network environment 100 represent any medium through which two nodes can communicate. The medium may be a tangible medium, such as a wire or fiber optic cable, or an intangible medium, such as a radio wave for wireless communication.

Thus, each of hosts 110*a*-110*d* may communicate with each other and with remote nodes linked to Internet 115, such as sensor 120, a web server 125, a mail server 130, and/or an instant messaging server 135. Hosts 110*a*-110*d* may also exchange email messages with a remote host 140 through mail server 130, for example. In general, hosts 110*a*-110*d* may be any type of node capable of running a program. In its most common sense, a host may be a general-purpose computer, such as a desktop computer, a workstation computer, a server, a laptop, a tablet computer (e.g., an iPad), or a mobile telephone (e.g., an iPhone), for example. Other devices such as hubs, routers, switches, sensors, and printers may also be hosts, but may also be distinguished from other types of hosts in certain contexts because they are typically configured as special-purpose computers.

Each of the elements of FIG. 1 may couple to one another through simple network interfaces or through any other suitable connection (wired or wireless), which provides a viable pathway for network communications. Additionally, any one or more of these elements may be combined or removed from the architecture based on particular configuration needs. Network environment 100 may include a configuration capable of transmission control protocol/Internet protocol (TCP/IP) communications for the transmission or reception of packets in a network. Network environment 100 may also operate in conjunction with a user datagram protocol/IP (UDP/IP) or any other suitable protocol where appropriate and based on particular needs.

For purposes of illustrating the techniques of a system and method for detecting a file embedded in an arbitrary location of a network environment, it is important to understand certain activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments provide the ability to communicate electronically with other networks. For example, the Internet may be used to access web pages hosted on remote servers, to send or receive electronic mail (i.e., email) messages, or to exchange files. However, new tactics for interfering with normal operations or gaining access to confidential information continue to emerge. Threats include, for example, any activity capable of interfering with the normal operation of a computer or network through unauthorized access to computers, networks, and/or data, unauthorized destruction, disclosure, and/or modification of data, and/or denial of service.

Malware in particular represents a continuing threat to computer security. "Malware" is commonly used as a label for any hostile, intrusive, or annoying software such as a computer virus, Trojan, worm, bot, spyware, adware, etc., but may also include other malicious software. Malware also typically includes one or more propagation vectors that enable it to spread within a network or across other networks, and in many cases can employ sophisticated attack schemes that include a combination of well-known and new vulnerabilities. Common propagation vectors include exploiting known vulnerabilities on hosts within the local network and sending malicious emails having a malicious program attached or providing malicious links within the emails. New tactics for deploying and exploiting malware continue to emerge, though. For example, malware can be embedded within other types of data, such as a portable document format (PDF) file, word processing document, image file, web page or email message attachment.

Antivirus software has been used to prevent and remove many types of malware, and a variety of strategies have been typically employed. For example, signature-based detection generally involves searching for known patterns of data within executable code. However, signature-based detection may be ineffective for new malware for which no signature is yet known. Antivirus software can have other disadvantages, as well, such as impairing a computer's performance. Users may also have trouble interacting with antivirus software, and an incorrect decision by a user may lead to a security breach. Moreover, antivirus software generally runs at a highly trusted level of an operating system, which may create additional vulnerabilities.

Some reputation systems can also offer a viable defense to some types of malware. In general, a reputation system can monitor activity and assign a reputation value or score based on past behavior. The reputation value may denote different levels of trustworthiness on the spectrum from benign to malicious. For example, a file reputation system can maintain a reputation value (e.g., minimal risk, unverified, high risk, etc.) associated with a file, or more commonly, with a hash value of the file. The term "file" is used here in a broad sense to include any unit of data, including any collection of related data or program instructions, and in general terms, a "hash value" is any value returned by a hash function, which maps one data set (e.g., the contents of a file) to a smaller data set (e.g., a fixed-size bit string). A file reputation system may be used to reject a file attached to an email or downloaded from a web server, for example, if the file hash value has an unacceptable reputation, such as one that indicates the file hash is known or likely to be associated with malicious activity.

However, both antivirus software and reputation systems are generally only effective if a file can be identified, which may not be possible if it is embedded in a network flow or another type of file. Network sensors, such as firewalls and other network intrusion prevention technologies, may not be able to identify many types of files embedded in a network flow. Some network sensors, for example, may be designed to discover embedded malware by looking for an executable file in a specific location of a network flow (e.g., Hypertext Transfer Protocol (HTTP) response attachments, email attachments, etc.), but it may not be discoverable if embedded in an unexpected location, such as in an image, movie, or portable document format (PDF) file, or in a protocol that is not parsed, such as an instant message file sharing protocol. Such a weakness may be exploited by steganographically embedding malware in plain sight, but in an unexpected location or with a protocol that is not parsed. Moreover, even if a malicious file can be detected by some sensors, they may be unable to detect the beginning and end of the file and, thus, unable to use antivirus software or a reputation system to determine if the file is suspicious or known to be malicious. For example, PDF allows resources or objects to be embedded in a file, which can be used or displayed when the file is viewed. Thus, a malicious executable may be embedded within an otherwise legitimate PDF file. Although PDF is generally understood and documented, the locations of the beginning and end of embedded resources are not well understood or documented, thereby potentially limiting the ability to evaluate the reputation of such a resource.

Other security technology focused on preventing unauthorized program files from executing may have undesirable side effects. For example, administrators may be charged with crafting extensive policies relevant to all facets of business activities to enable employees to obtain software and other electronic data from desirable and trusted network resources. Without extensive policies in place, employees may be prevented from downloading software and other electronic data from network resources that are not specifically authorized, even if such software and other data facilitate legitimate and necessary business activities. In addition, such systems may be so restrictive that if unauthorized software is found, any activity may be suspended pending network administrator intervention. For businesses, this type of system may interfere with legitimate and necessary business activities, resulting in employee downtime, lost revenue, significant information technology overhead, and the like.

In accordance with embodiments disclosed herein, network environment 100 can overcome these shortcomings (and others) by detecting a file embedded in an arbitrary location. In more particular embodiments, for example, the beginning of a file may be detected in an arbitrary protocol by searching packets of a network flow (i.e., a sequence of packets sent from a source to a destination) for a file format identifier, which may be any data that can be used to identify or verify the content and/or format of a file, such as a magic number or file signature, for example. The file may then be parsed until the end of the file is located. A hash of the file may be calculated and sent to a reputation system to determine the reputation of the file. An appropriate policy action can be taken based on the reputation of the file, such as terminating or blocking a network connection, quarantining the file, and/or alerting the user and/or an administrator, for example. In example embodiments in which a file is embedded within a network flow, the end of the file may be located and the hash may be calculated without any support from a host protocol (e.g., without HTTP content-length support).

Network environment 100 may be particularly advantageous for detecting binary executable files embedded in arbitrary locations, such as in a PDF document, which could be stored in memory or could be encoded in one or more packets of a network flow. Most operating systems require binary executable files (i.e., a file containing program instructions) to conform to a specific format so that a loader can parse and execute the instructions. Such a format may be well documented by the operating system vendor, and is generally well known and understood by software developers. For example, a WINDOWS portable executable (PE) file generally includes a specific pattern that can be used to identify the beginning of the file in an otherwise arbitrary stream of data. More particularly, a WINDOWS PE file should include the file format identifiers "MZ" and "PE00" that a loader can use to distinguish a valid executable file from other file types. Thus, the beginning of a WINDOWS executable file may be detected by locating these strings in a network flow, for example. This location may be used as the offset in the network flow from which a hash algorithm may be started. An executable file header and individual section headers of the file may be parsed (without parsing the protocol or format of the container) to determine the size of the file, which can be used to locate the end of the file without any support from a container protocol (e.g., HTTP) or file (e.g., PDF). A "header" generally refers to data that is placed at a beginning of a block of data or code. The hash algorithm may be stopped at the end of the file and the hash may be sent to a reputation system or threat intelligence system to determine the reputation (i.e., dirtiness) of the executable with near zero false positives.

Figure 2:
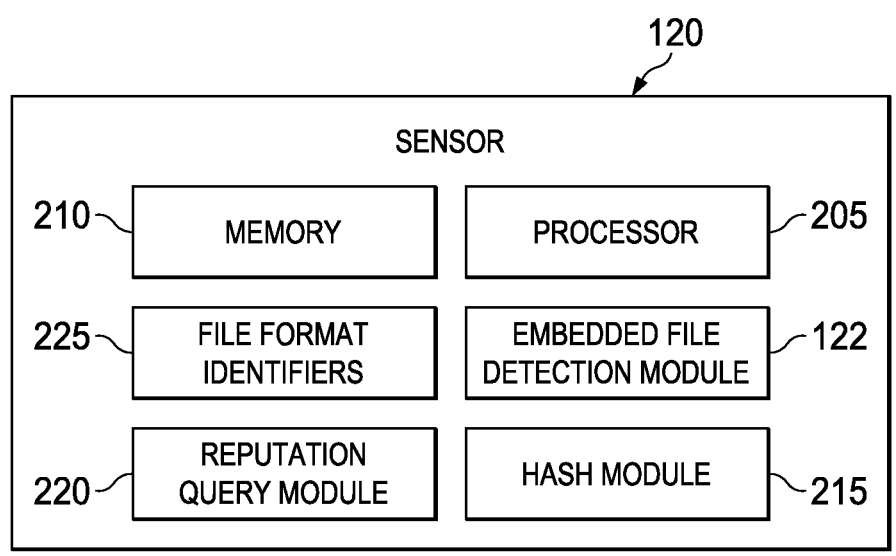
FIG. 2 is a simplified block diagram illustrating additional details that may be associated with the network environment.

Turning to FIG. 2, FIG. 2 is a simplified block diagram illustrating additional details that may be associated with one potential embodiment of sensor 120. Sensor 120 may include a processor 205, a memory element 210, and various hardware and/or software elements. More particularly, sensor 120 may include embedded file detection module 122, a hash module 215, and reputation query module 220. Sensor 120 may further include various data elements, including file format identifiers 225.

Sensor 120 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory 210) should be construed as being encompassed within the broad term "memory element." Data elements (e.g., file format identifiers 225) could be provided in any database, register, queue, table, control list, or other storage structure, all of which can be referenced at any suitable timeframe. Any such storage options may also be included within the broad term "memory element" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 2) can store data used for the operations described herein. This includes the memory elements being able to store software, logic, code, or processor instructions that are executed to carry out the activities described herein.

A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

In certain example implementations, sensor 120 is a network element representative of any network appliance, server, router, switch, gateway, bridge, load-balancer, firewall, intrusion prevention system, processors, modules, or any other suitable device, component, element, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In certain example implementations, sensor 120 may include software (e.g., embedded file detection module 122) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Figure 3:
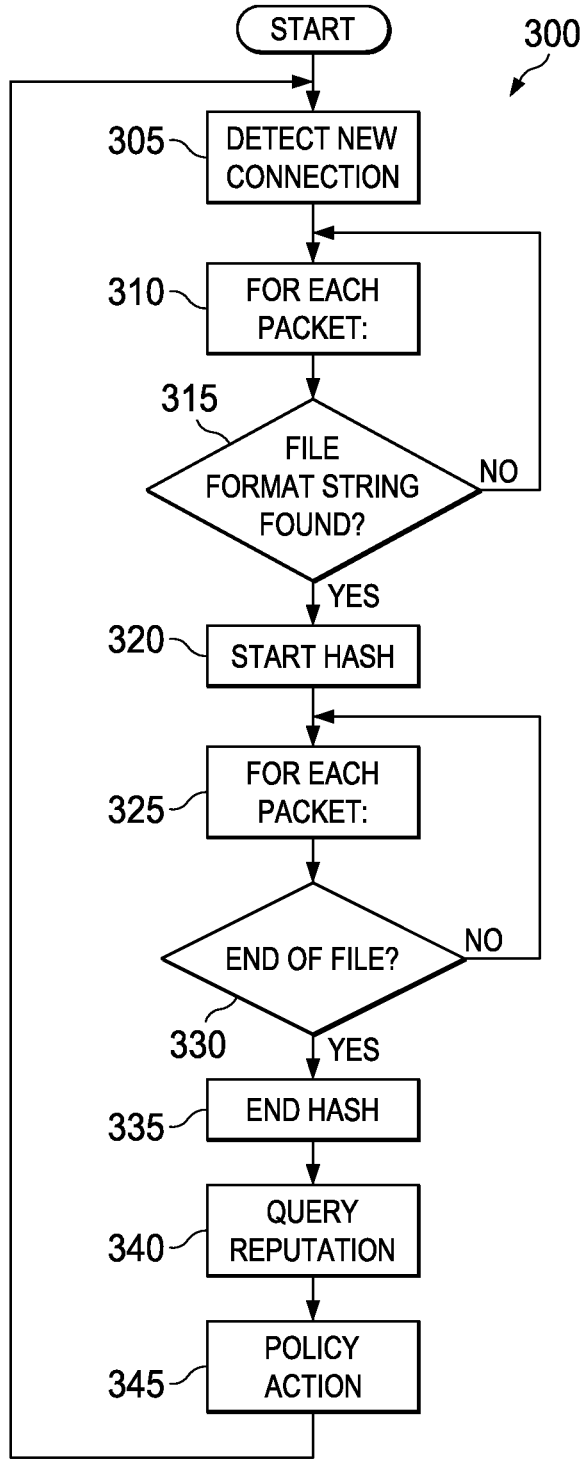
FIG. 3 is a simplified flowchart illustrating potential operations that may be associated with the network environment.

FIG. 3 is a simplified flowchart 300 illustrating potential operations for that may be associated with certain example embodiments of network environment 100. In some embodiments, such operations may be implemented by sensor 120 (e.g., embedded file detection module 122, etc.), to identify a file embedded in an arbitrary location of a network flow.

A new network connection may be detected at 305. For example, TCP generally opens a new connection with a handshake—a host sends a packet with one of the TCP flag bits (i.e., the SYN bit) set to indicate that a three-way handshake is in progress. Thus, a new TCP connection may be detected by identifying a SYN packet (i.e., a packet with the SYN bit set). However, a "connection" is not limited to communications using a reliable protocol such as TCP; a connection may also include communications using an unreliable protocol such as UDP or IP. In such embodiments, network flows may be tracked to detect a new network flow. For each packet in the network flow at 310, the packet may be inspected for a file format identifier, which may be stored in file format identifiers 225, for example. The beginning of a file may be indicated if a file format identifier is found at 315, and a hash algorithm may be started at 320. For each subsequent packet transmitted through the network connection at 325, the packet may be inspected to identify the end of the file. For example, a second file format identifier may be identified that marks the end of the file, or a file header may indicate the size of the file. In the latter case, the size of each file portion in a packet may be added until identifying the packet with the last byte. If the end of the file is identified at 330, the hash algorithm may be ended at 335. The hash may be sent to a reputation system at 340, and an appropriate policy action may be taken at 345 based on the response from the reputation system.

FIGS. 4A-4B provide a listing 400 of pseudocode illustrating potential operations that may be associated with more particular embodiments of network environment 100. In some embodiments, such operations may be implemented by sensor 120 (e.g., embedded file detection module 122, etc.), to identify a file embedded in an arbitrary location of a network connection.

The pseudocode in FIGS. 4A-4B is, in general, a compact and informal high-level description of an algorithm. Listing 400 includes structural conventions based on the programming language C, but may omit certain details to facilitate understanding of certain principles of the algorithm. For example, variable declarations, system-specific code, and subroutines are generally omitted. The pseudocode is augmented with natural language descriptions of the details, generally embedded between /* and */ pairs or after a //.

Figure 5A:
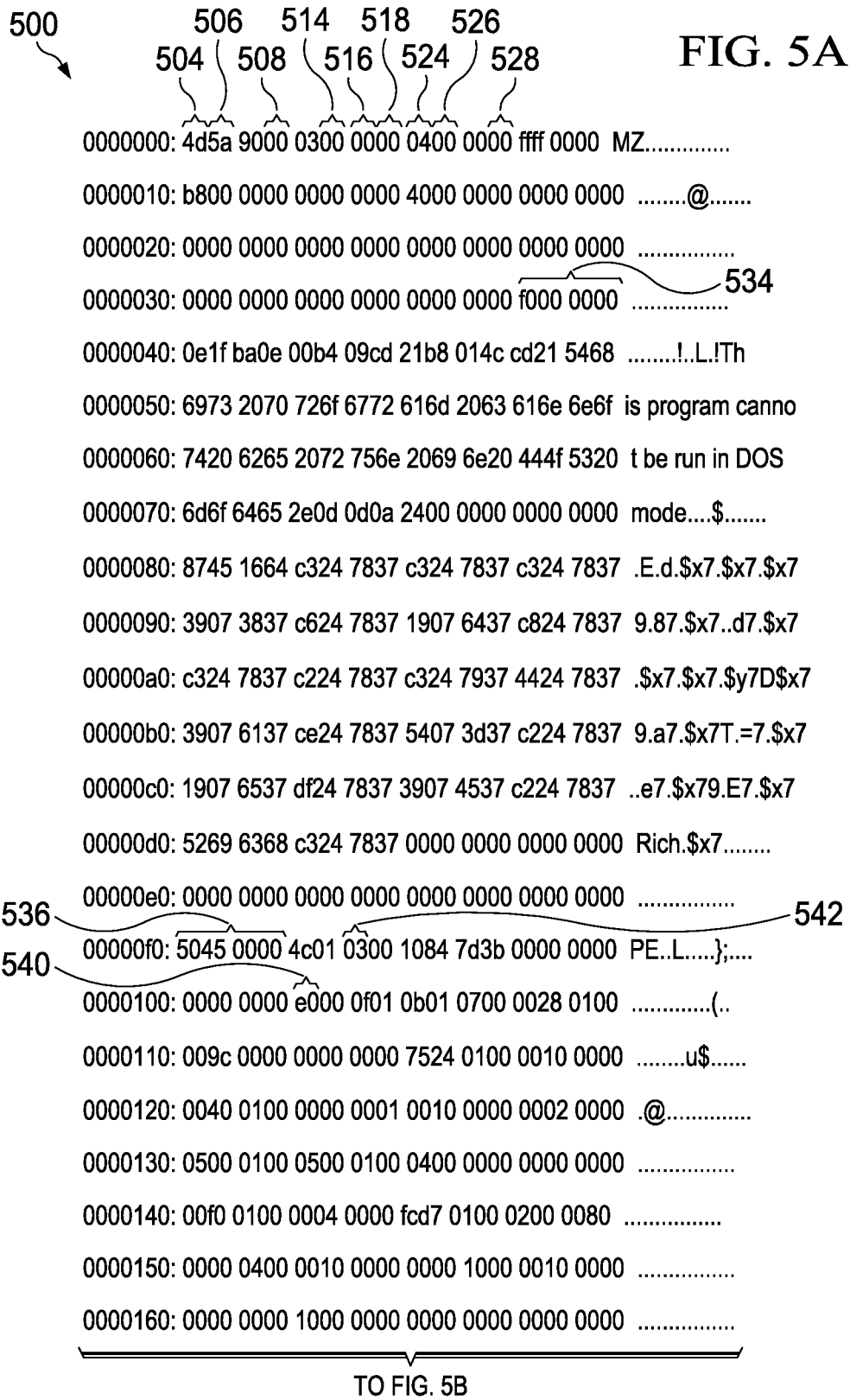

FIGS. 5A-5B provide a hexadecimal view (i.e., "hex dump") of an example WINDOWS PE file 500 that may be embedded in an arbitrary location of a network flow. The first column in FIGS. 5A-5B represents a memory address offset (in hexadecimal notation) from the beginning of the file for the first byte in each line, and the last column provides a plain text translation of each line. This view of example file 500 is provided merely as an expedient tool for further illustrating certain operations described with reference to listing 400.

In the example embodiment of FIGS. 4A-4B, the operations may be used to identify and parsing a WINDOWS executable file embedded in an arbitrary location of a network flow. At line 402 in the example listing of FIG. 4A, a pointer ("ptr") may be set to the beginning of the network flow ("stream"). Thus, the first byte of the network flow may be represented by the pointer "ptr[0]," the second byte by "ptr[1]," the third byte by "ptr[2]," etc. In a stream containing example file 500, the variable "ptr" may point to the hexadecimal address 00000000. Note that this address has been selected merely to simplify the illustration; in practice the address may vary significantly. Since a WINDOWS executable file generally begins with an "MZ" in the first two bytes, the values at ptr[0] and ptr[1] can be evaluated and compared to this string. If the first byte (i.e., ptr[0]) is not an "M" (represented by the hexadecimal notation 0x4D) at line 404, the second byte (i.e., ptr[1]) is not a "Z" (represented by the hexadecimal notation 0x5A) at line 406, and the fourth byte with certain bits masked (i.e., ptr[3] masked by 0xFE) is not a zero at line 408, then no further evaluations may be needed and the algorithm may terminate (e.g., exit) at line 410. These three conditions are satisfied in example file 500 at 504, 506, and 508, respectively.

If all three conditions are satisfied, additional bytes may be evaluated for consistency with a WINDOWS executable file format patterns to reduce false positive identifications. For example, the next four bytes in the stream may be evaluated by setting the pointer to the fifth byte (i.e., stream+4) at line 412. If the sixth (ptr[1]), seventh (ptr[2] masked by 0xE0), and eighth (ptr[3]) bytes in the stream are not all zero at lines 414, 416, and 418, respectively, then the algorithm may terminate at line 420. Example file 500 matches this pattern of all zeroes at 514, 516, and 518, respectively. The next four bytes also typically exhibit a consistent pattern in WINDOWS executable files, so the pointer may be set to the ninth byte (i.e., stream+8) at line 422. If the ninth (ptr[0] masked by 0xC0), tenth (ptr[1]), and twelfth (ptr[3] masked by 0xFE) byte are not all zero at lines 424, 426, and 428, respectively, the algorithm may terminate at line 430. Example file 500 matches this pattern of all zeroes at 524, 526, and 528, respectively.

If the first four bytes match the "MZ" pattern (and optionally, the next eight bytes also match the pattern described above), at line 432 a hash function may begin hashing bytes in parallel from the beginning of the stream.

The subsequent file structure may be parsed to locate the end of the file. For example, a WINDOWS executable binary file for a graphical environment may specify the location of another format identifier of "PE00" at an offset of 0x3C. Thus, the expected location may be determined at line 434 by examining the four-byte word at an offset of 0x3C from the beginning of the stream. For example, offset 534 at 0x3C in example file 500 indicates that the string (and the beginning of the "PE header") should be found at 000000f0 (noting that the four-byte word in example file 500 is in little endian format). In example file 500, the hexadecimal equivalent of the string "PE00" is at 536, beginning at the address 000000f0. If the string "PE00" is not found at the expected location at line 436, the algorithm may terminate at line 438.

A WINDOWS executable binary file may also include an optional header and one or more sections, such as a data section, resource section, etc. The size of the optional header may be specified at an offset of 20 bytes from the beginning of the PE header (e.g., at 540 in example file 500), which can be retrieved at line 440, and the number of sections may be retrieved from an offset of 6 bytes from the beginning of the PE header (e.g., at 542 in example file 500) at 442. Each section may include a section header that is 40 bytes long (e.g., headers 543a-543c), and each section header may include an 8-byte section name and a 4-byte virtual size. Thus, a location within the last section header may be determined at line 444.

An executable binary file may also include a certificate or other component objects appended to the file. In a WINDOWS PE file, for example a certificate may generally be identified at an offset of 152 bytes from the beginning of the PE header, for example, at line 446. A certificate is usually a fixed length, and the size of the certificate may be determined at line 448. If no certificate is identified, the size may be set to zero at line 450.

The size of the last section may be specified in the header of the last section, such as at 552 in example file 500, and retrieved at line 452. The offset of the raw data from the beginning of the PE header may also be identified in the last section header, such as at 554 in example file 500, and retrieved at line 454. The total size of the file may be calculated at line 456 by adding the value of the raw data offset, the size of the raw data, and the size of the certificate, if any.

The hash function may be stopped at line 458 if the number of bytes processed is equal to the total size of the file determined at line 456, and the hash value may be sent to a reputation system at line 460 to evaluate the file's reputation. At 462, an appropriate policy action may be taken based on the response from the reputation system.

In general, the hash function applied to the file may be selected to minimize false positive matches with hash values in a reputation system by balancing the rate of incorrect hash calculation with the rate of hash collisions. For example, an MD5 hash may be calculated with errors in less than 1% of them, and since MD5 collisions are rare in general, it is unlikely that these erroneous hashes would match malware known to a reputation system. Consequently, network environment 100 can significantly increase chances of discovering a file and querying a reputation system while also ensuring rare false positives.

Network environment 100 may provide significant advantages, some of which have already been discussed. For example, in a typical enterprise scenario, an executable file embedded in an arbitrary network location (e.g., instant-messaging file transfers, in image files, etc.) may be detected, regardless of operating system or protocol. Network environment 100 can also substantially reduce processing cycles and memory use since container protocols and files do not need to be parsed, i.e., network environment 100 does not need to parse HTTP, SMTP, FTP, PDF, etc. to detect an embedded file. And while some potential operations of network environment 100 have been described with reference to a particular type of file (i.e., the WINDOWS PE file), such operations are readily extensible to other file types, including file types having a file format identifier and a format that is known or that can be reverse engineered, for example.

In the examples provided above, as well as numerous other potential examples, interaction may be described in terms of two, three, or four network elements. However, this has been done for purposes of clarity and example only. In certain cases, it may be easier to describe one or more of the functionalities of a given set of operations by only referencing a limited number of network elements. It should be appreciated that network environment 100 is readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that steps in the appended diagrams illustrate only some of the possible scenarios and patterns that may be executed by, or within, network environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a plurality of packets associated with a file at a node, which comprises a sensor that is to interact with a reputation system, wherein the file is an executable file embedded in a second file in a network flow;
   identifying a file format identifier associated with a beginning of the file;
   parsing the file based on the file format identifier to identify an end of the file, wherein only the file is parsed to identify the end of the file, and wherein portions of the second file that do not include the file are not parsed to identify the end of the file;
   calculating a hash value from the beginning of the file to the end of the file;
   sending the hash value to the reputation system;
   receiving a reputation value associated with the hash value from the reputation system; and
   taking a policy action based on the reputation value, wherein the policy action includes quarantining the file.

2. The method of claim 1, wherein the file is a binary file.

3. The method of claim 1, wherein:
   the file format identifier is a string comprising "MZ."

4. The method of claim 1, wherein:
   the file format identifier is a string comprising "PE00."

5. The method of claim 1, wherein parsing the file comprises parsing a header in the file to determine a size of the file.

6. The method of claim 1, wherein:
   the file format identifier is a string comprising "MZ"; and
   parsing the file comprises parsing a header in the file to determine a size of the file.

7. The method of claim 1, wherein parsing the file comprises parsing a header in the file to detect a certificate associated with the file.

8. The method of claim 1, wherein the hash value is calculated with a hash function selected to minimize a false positive match with malware if the hash value is incorrect.

9. Logic encoded in one or more non-transitory media that includes code for execution and when executed by one or more processors is operable to perform operations comprising:
   receiving a plurality of packets associated with a file at a node, which comprises a sensor that is to interact with a reputation system, wherein the file is an executable file embedded in a second file in a network flow;
   identifying a file format identifier associated with a beginning of the file;
   parsing the file based on the file format identifier to identify an end of the file, wherein only the file is parsed to identify the end of the file, and wherein portions of the second file that do not include the file are not parsed to identify the end of the file;
   calculating a hash value from the beginning of the file to the end of the file;
   sending the hash value to the reputation system;
   receiving a reputation value associated with the hash value; and
   taking a policy action based on the reputation value, wherein the policy action includes quarantining the file.

10. The encoded logic of claim 9, wherein the file is a binary file.

11. The encoded logic of claim 9, wherein:
    the file format identifier is a string comprising "MZ."

12. The encoded logic of claim 9, wherein:
    the file format identifier is a string comprising "PE00."

13. A node, comprising:
one or more processors;
a memory; and
a sensor that is to interact with a reputation system, wherein the apparatus is configured for:
  receiving a plurality of packets associated with a file at the node, wherein the file is an executable file embedded in a second file in a network flow;
  identifying a file format identifier associated with a beginning of the file;
  parsing the file based on the file format identifier to identify an end of the file, wherein only the file is parsed to identify the end of the file, and wherein portions of the second file that do not include the file are not parsed to identify the end of the file;
calculating a hash value from the beginning of the file to the end of the file;
sending the hash value to the reputation system;
receiving a reputation value associated with the hash value; and
taking a policy action based on the reputation value, wherein the policy action includes quarantining the file.

14. The node of claim 13, wherein the file is a binary file.

15. The node of claim 13, wherein:
the file format identifier is a string comprising "MZ."

\* \* \* \* \*

UNITED STATES PATENT AND TRADEMARK OFFICE
CERTIFICATE OF CORRECTION

| | | |
|---|---|---|
| PATENT NO. | : 8,650,638 B2 | Page 1 of 1 |
| APPLICATION NO. | : 13/276197 | |
| DATED | : February 11, 2014 | |
| INVENTOR(S) | : Denys Lok Hang Ma et al. | |

It is certified that error appears in the above-identified patent and that said Letters Patent is hereby corrected as shown below:

On the Title page, in item (75), in column 1, in "Inventors", line 1, delete "Santa Clara, CA" and insert -- Mountain View, CA --, therefor.

On the Title page, in item (75), in column 1, in "Inventors", line 2, delete "Santa Clara, CA" and insert -- Milpitas, CA --, therefor.

Signed and Sealed this
Fifteenth Day of July, 2014

Michelle K. Lee
*Deputy Director of the United States Patent and Trademark Office*